United States Patent Office 3,428,247
Patented Feb. 18, 1969

3,428,247
CENTRIFUGE LUBRICATING AND SEAL SYSTEM
Lorenz J. Andresen, Chicago, and John J. Halloran, Jr., Lombard, Ill., assignors to Combustion Engineering, Inc., Windsor, Conn., a corporation of Delaware
Filed Sept. 26, 1967, Ser. No. 670,548
U.S. Cl. 233—7                    5 Claims
Int. Cl. B04b 1/12, 3/04, 5/00

ABSTRACT OF THE DISCLOSURE

A centrifuge for pressurized high temperature operation on a continuous basis and having a bowl and conveyor, each rotating at different speeds. A continuous flow lubricating system providing lubrication of the bearings between the two differently rotating parts and a seal air system for protecting the oil seals and clearances from the hot dirty air inside the centrifuge.

Background of the invention

Coal may be transported long distances by mixing it with water to form a slurry and by pumping it through a pipeline to the point of use. In order to burn the coal in a steam generator the water and coal must be separated, and it is advantageous to do this on a continuous basis through the use of a centrifuge. The solids discharged from the centrifuge pass directly to a pulverizer where the coal is further dried, pulverized and immediately fired in a furnace. Pressurized operation of steam generator furnaces is generally used on large units because of a saving in fan power. This often requires that the pulverizers be pressurized and since the centrifuge discharges directly into the pulverizer, it must also operate under a pressurized condition. The air inside the centrifuge is hot and quite dirty and contains abrasive material which would, in addition to contaminating the room air, damage oil seals and the components forming close clearances between rotating parts if the air were to flow outwardly due to the pressurized condition within the centrifuge.

Since the centrifuges are directly connected to a pulverizer which fires a steam generator, they are required to operate continuously, such as 24 hours a day and 7 days a week. Shutting down the centrifuge for lubrication would require taking a pulverizer our of service or, if only one served each pulverizer, at least reducing the load on a pulverizer where several centrifuges supply each thereby upsetting operation of the furnace unnecessarily. It is anticipated that some applications will require heated slurry, and thus the extra heat in the bearings must be considered. It is, therefore, desirable that a lubricating space, from which it flows longitudinally between the cation is continuous, the oil can be cooled, and the centrifuge can operate for an indefinite period of time. Where the centrifuge is used for pressurized operation, it is also important that the centrifuge be lubricated in such a manner as to avoid any contamination of the oil or oil seals by the hot dirty air inside the centrifuge.

Brief description of the invention

The driven end of the centrifuge has a centrally located slurry feed tube. Concentrically surrounding this is first a conveyor shaft rotating at one speed and secondly a bowl shaft rotating at a second speed. A thrust bearing and a bushing is located between the two differently rotating shafts. Oil is located between the two differently rotating shafts. Oil is supplied through a stationary member at the outboard end of these shafts into an annular space, from which is flows longitudinally between the shafts through the thrust bearing and the bushing to another annular space. From this latter annular space the oil passes through a hole drilled in the bowl shaft to an annular space between the bowl shaft and a fixed housing. The oil can then be cooled and returned for recirculation.

An air seal is supplied at the outboard end of the shaft from which air flows from an annular space through the clearance between the slurry feed tube and the conveyor shaft into the centrifuge interior, thereby preventing the flow of hot dirty air outwardly from the centrifuge where it would contaminate the surrounding atmosphere and damage oil seals and the members forming close clearances. Another air seal supply passes through the housing at the inboard end of the shaft to an annular space between the housing and the bowl shaft. The air passes through a hole drilled through the bowl shaft to an annular space between the centrifuge interior and the inboard annular space for the oil flow. An oil seal is located between the air and oil annular spaces and the flow of air avoids contamination of the oil seal with the air flowing through a close clearance between the bowl shaft and the conveyor shaft into the centrifuge interior.

The opposite or solids discharge end of the centrifuge also has concentric differently rotating shafts, but there is no centrally located slurry feed tube. Oil supply to this end, therefore, passes into the end of the conveyor shaft and flows longitudinally through a centrally drilled hole and then radially to an annular space in a bushing between the conveyor and bowl shafts. The oil passes across the bushings flowing longitudinally between the shafts and outwardly through a hole drilled in the bowl shaft to an annular space between a fixed housing and the bowl shaft. From this point the oil is recirculated. An oil seal is provided at the inboard end of this shaft to prevent the oil from flowing into the centrifuge. An air seal is provided between this oil seal and the interior of the centrifuge. An annularly located seal air connection between the fixed housing and the bowl shaft supplies the air. A hole through the bowl shaft conveys this air to an annular space between the bowl and conveyor shafts at a location just inboard of the oil seal. This air protects the oil seal from the pressurized dirty atmosphere inside the centrifuge, with the air flowing into the centrifuge through a close clearance between the two differently rotating shafts.

A separate independently driven rotating gutter is supplied, with this gutter being lubricated by maintaining an oil level in the stationary bearing housing. An air seal is also provided to prevent leakage from the centrifuge housing and to protect the gutter bearing oil side by providing seal air introduction between the housing and the rotating gutter shaft.

Description of the preferred embodiment

Figure 1:
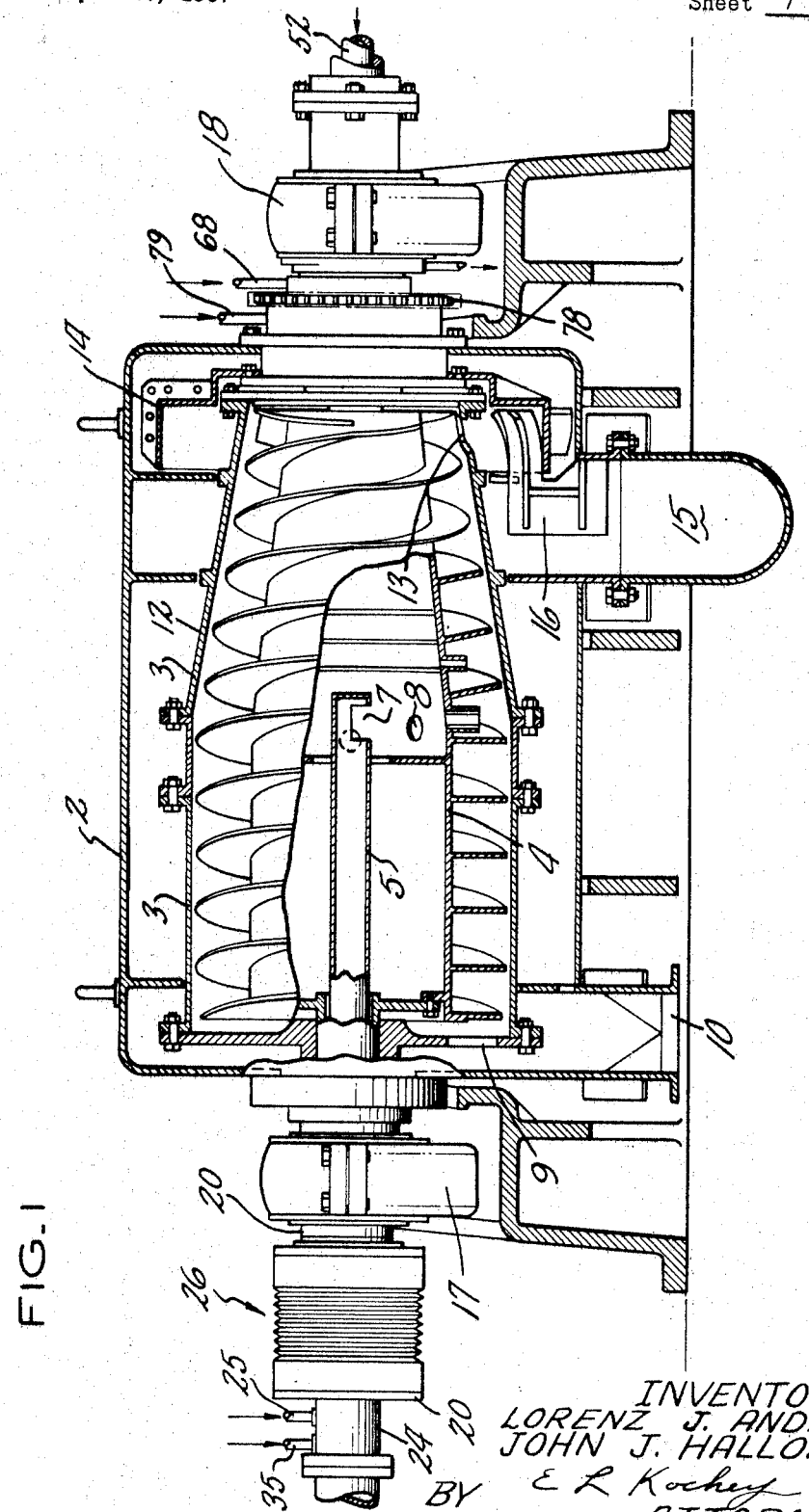
FIGURE 1 is a partially sectionalized side elevation of the general arrangement of the centrifuge.

Referring to FIGURE 1, stationary housing 2 is designed to contain the pressure under which the centrifuge must operate and contains within it a rotating bowl 3 which rotates at 1000 r.p.m. and a rotating conveyor 4 which rotates in the same direction at 1010 r.p.m. The slurry mixture of coal and water is fed longitudinally along the axis of the centrifuge through the slurry feed tube 5.

This slurry passes through an opening 7 at the end of the feed tube and flows through openings 8 in the conveyor. The mixture then is held by centrifugal action against the inside perimeter or bore of the bowl 3. The water flows longitudinally to the left passing through a hole 9 in the end of the bowl and thence through the water outlet 10 to discharge. The separated coal is moved along the beach 12 of the bowl 3 by the relative motion between the screw thread of the conveyor and the bowl. The coal is discharged through the opening 13 at the solids discharge end of the bowl where it is thrown against the gutter 14. The rotating gutter 14 moving at only 10 r.p.m. continuously passes the fixed scraper 16 which scrapes the coal sludge from the gutter. These solids are then passed downwardly through the solids discharge line 15 and directly into a pulverizer (not shown).

The main support for the main rotating parts of the centrifuge is supplied by the drive end pillow block bearing 17 and the discharge end pillow block bearing 18. These bearings support the bowl shaft and are conventionally mounted stationary bearings. Conventional lubricated bearings of any appropriate sort may be used at these locations, with proper allowance made for the expansion of the centrifuge.

The slurry feed tube 5 extends longitudinally through the drive end of the centrifuge housing. The conveyor 4 has a conveyor shaft 19 which extends outwardly from the conveyor proper and concentrically surrounds the slurry feed tube 5. The bowl 3 has a bowl shaft 20 which extends outwardly from the bowl proper and concentrically surrounds the conveyor shaft 19. A thrust bearing 22 is located between the conveyor and bowl shafts to accept the thrust due to the movement of coal longitudinally toward the coal discharge end of the centrifuge.

A bushing 23 is located between these shafts at the inboard end to support the radial conveyor loading. These bearings must take substantial load due to the heavy forces operating within the centrifuge and withstand high temperatures, especially when heated slurry is used. They must be, therefore, continuously lubricated and the system adapted for cooling of the oil as required.

Figure 2:
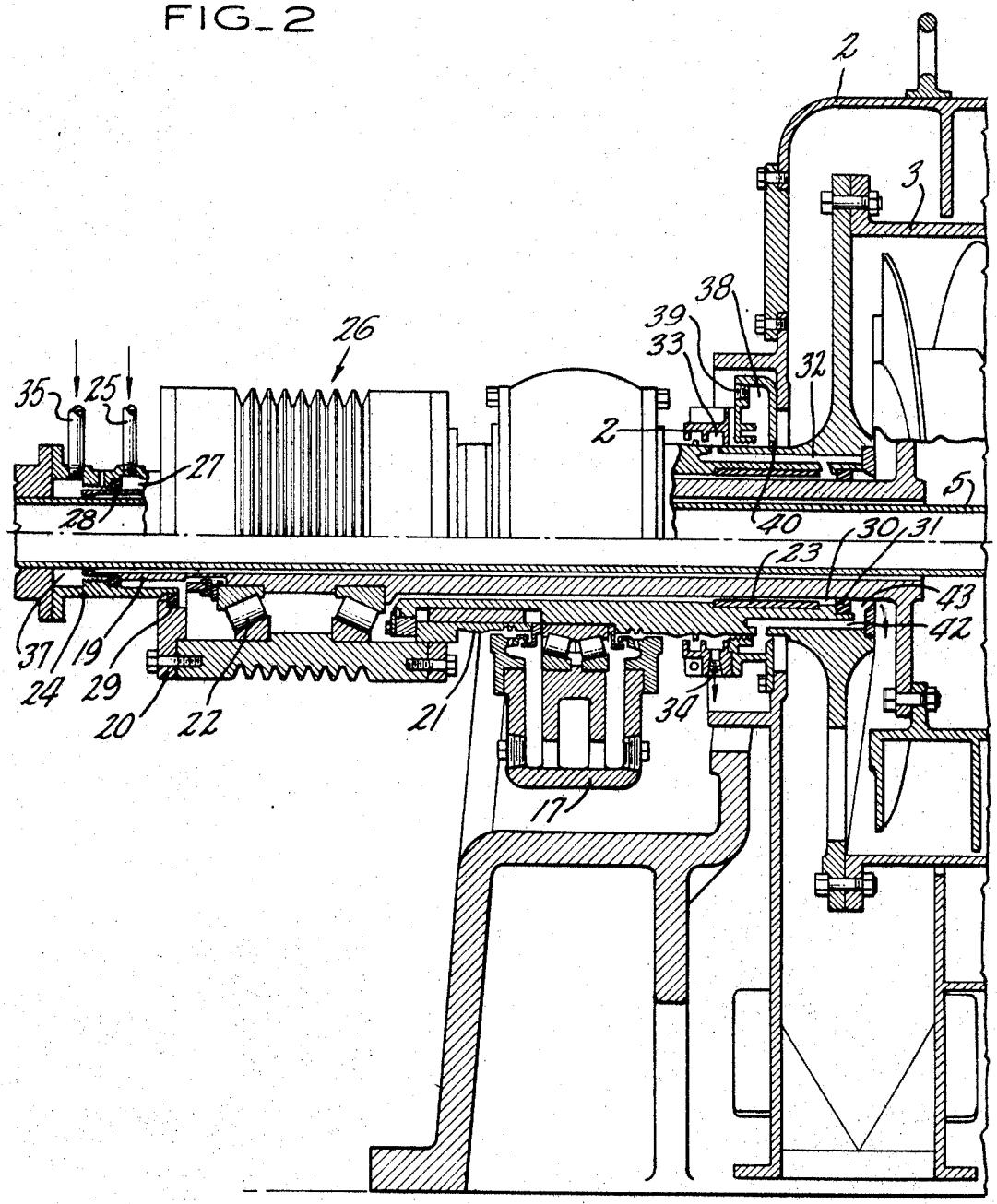
FIGURE 2 is a more detailed view of a sectional side elevation of the drive end of the centrifuge showing the lubricating and sealing system in detail.

Referring to FIGURE 2, the slurry feed tube 5 which is stationary is bolted directly to a stationary member 24. Sheave 26 forms a portion of the bowl shaft 20 and is used to drive the centrifuge by a motor (not shown). Oil is continuously supplied through an oil inlet 25 at a pressure of about 20 p.s.i. to an annular space 27 between the stationary member 24 and the conveyor shaft 19. An oil seal 28 is supplied between the stationary member 24 and the conveyor shaft to prevent flow of oil outwardly from the annular space 27. Another oil seal 29 is supplied between the stationary member 24 and the bowl shaft 20. The oil flows longitudinally through the annular opening between the conveyor shaft and the stationary member 24 and then through the annular opening between the two shafts. In doing so it flows through the thrust bearing 22 continuing through the annular space between the conveyor and bowl shafts towards the centrifuge bowl and through bushing 23. The oil then passes to annular oil space 30 with an oil seal 31 being located between the shafts at a location just inboard of the annular oil space 30. The oil then flows radially and longitudinally through a hole 32 drilled in the bowl shaft 20. An annular oil collecting space 33 is provided between the stationary housing 2 and the rotating bowl shaft 20. The annular space could be provided by using the stationary housing of bearing 17 instead of the centrifuge housing 2, if desired. The oil hole 32 is located so as to discharge the oil flow into this annular space wherefrom the oil is collected passing through oil outlet 34 from which it is returned to be recirculated.

This arrangement permits the high pressure oil seal 28 to be located where the diameter to be sealed is relatively small, thereby avoiding high sealing velocities which a large diameter seal would encounter. No seal is required at annular space 33 where the relative velocity between the housing and shaft is high. Reversing the direction of oil flow could be accomplished, but oil seals would be required around the annular space 33.

The thrust bearing 22 is so located that the diameter around the centrifuge centerline of the bearing surface is greater than the bore of the bowl shaft at the inboard side and greater than the bore of the bowl shaft on the outboard side. Therefore, should the oil supply fail, centrifugal action will keep oil in this thrust bearing for sufficient time for the centrifuge to coast to a stop without damaging the bearings due to operation without lubrication. Reducing the diameter of the stationary member while not restricting the diameter of the shaft bore outside the bearing surface would accomplish the same result, but would increase the friction on oil seal 29.

Two seal air systems are provided on the drive end of the centrifuge. In the first system clean cool air is supplied at about 2 p.s.i. pressure through the seal air supply pipe 35 passing into an annular space 37 between the stationary member 24 and the slurry feed tube 5. This clean cool air supply seals the backside of oil seal 28 from the hot dirty air of the centrifuge interior. The sealing air flows from the annular space 37 longitudinally through an annular space between the slurry feed tube 5 and the conveyor shaft 19 so that the air flows into the centrifuge. This flow of clean air into the centrifuge prevents dirty air from escaping through the clearances in such a manner as to contaminate the seal 28.

A second seal air system is provided at the inboard end of these shafts. An annular space 38 is provided in the housing, the seal air being supplied through the supply opening 39. A portion of this air passes through the close clearance 40 between the housing 2 and the bowl shaft 20 thereby preventing the escape of hot dirty air from the pressurized centrifuge. Another portion of this air flows radially and longitudinally through a hole 42 drilled through the bowl shaft so that air is supplied to an annular space 43 which is located between the bowl shaft 20 and the conveyor shaft 19 at a location just outboard of the oil seal 31. A close clearance between the two shafts is provided just inboard of this annular space so that the cool clean air flows inwardly to the centrifuge thereby preventing the hot dirty air from the centrifuge reaching the oil seal 30.

Figure 3:
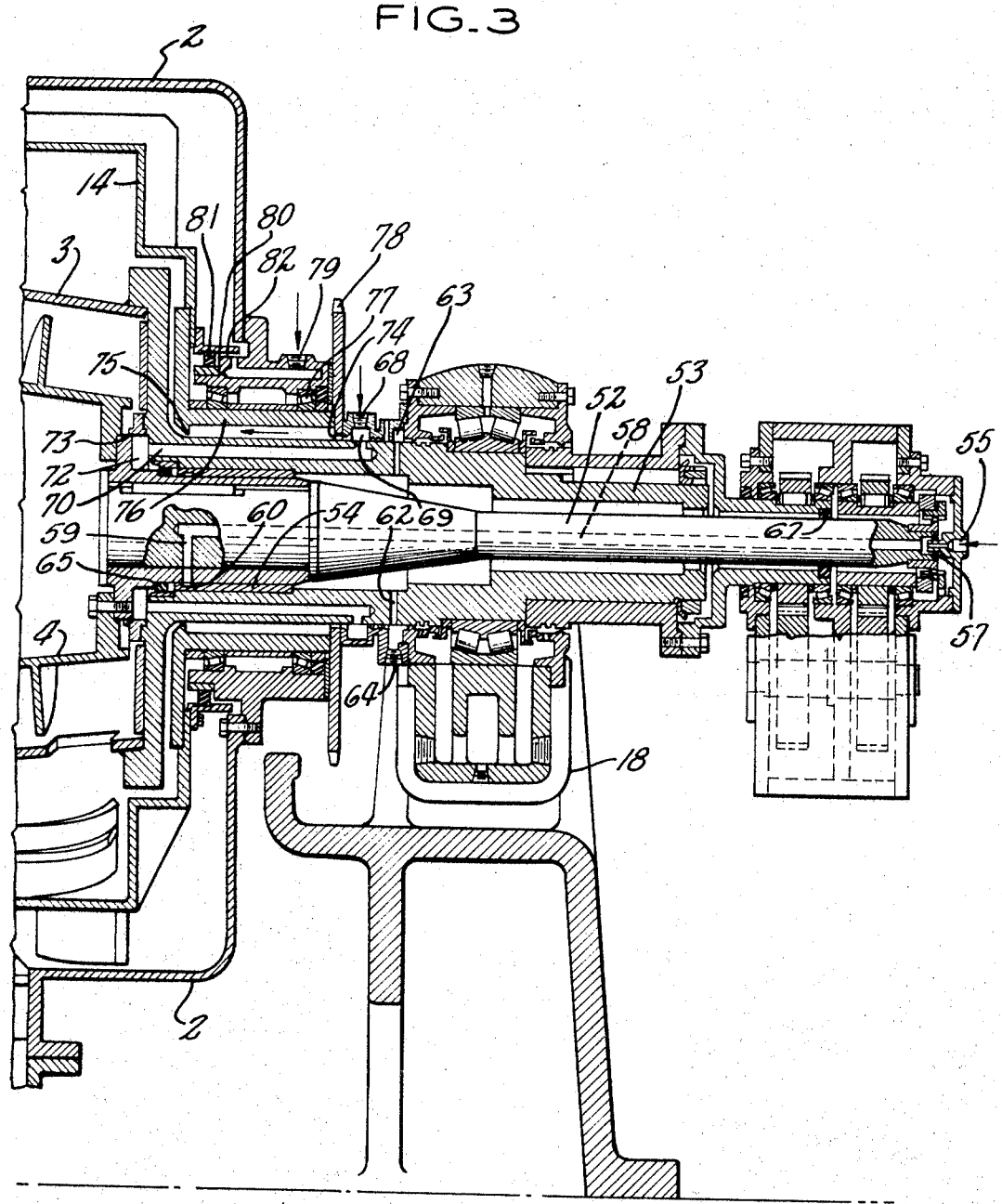
FIGURE 3 is a sectional side elevation of the discharge end of the centrifuge showing the lubricating and sealing system in detail.

Referring to FIGURE 3, at the solids discharge end of the centrifuge the conveyor and bowl are also supported. The conveyor 4 has a drive shaft 52 which extends longitudinally along the axis of the centrifuge. Concentrically surrounding this is a bowl shaft 53 which also extends longitudinally along the axis of the centrifuge. These two shafts are connected through a gear unit so that driving of the bowl shaft as a result of the power input on the far end operates through the gear unit to rotate the conveyor shaft at a different speed but in the same direction. The bowl shaft 53 is supported by the pillow bearing 18 as previously described. The conveyor shaft 52 is supported from the bowl shaft 53 by bushing 54 which must be continuously lubricated. Oil is supplied through an inlet 55 in a gear box 56, the housing of which is in this case a stationary member, and passes directly into a hole drilled through the conveyor shaft 52 with leakage being prevented by oil seal 57. The oil passes longitudinally through a hole 58 drilled through the shaft and through a radial hole 59 drilled through this shaft at an inboard location. This oil is thereby supplied to an annular space 60 formed by a groove in the bushing 54 between the bushing and the conveyor shaft 52. The oil flows along this bushing through a spiral groove in the bushing between the conveyor shaft and the bushing, and subsequently along the annular space between the two shafts and through a radial hole 62 drilled in the bowl shaft 53. An annular space 63 is formed by the bearing housing 18, which could equally well be stationary housing 2, with the oil passing through the hole 62 entering this annular space and being discharged through opening 64 for cooling and recirculation through the lubricating system. An oil seal 65 is supplied between the two shafts at the inboard side and oil seal 67 is supplied between the conveyor shaft and the gear box housing stationary member at the outboard side.

The inboard oil seal is kept clean by cool seal air supplied through opening 68 in the stationary housing where it is supplied to an annular opening 69. The air then passes radially and longitudinally through hole 70 drilled in the bowl shaft 53 supplying an annular space 72 between the two shafts. This air protects the backside of oil seal 65 and passes through a close clearance 73 between the conveyor 4 and the bowl 3.

A portion of the seal air supplied to annular space 69 passes through close clearances 74 and 75 thereby passing to the housing interior and preventing leakage of the hot dirty air to the atmosphere.

Rotating gutter 14 has a hollow shaft 76 which concentrically surrounds the bowl shaft 53. This shaft is supported from the housing 2 by bearing 77 and has no direct connection with the other rotating shafts. This rotating gutter is driven by a separate drive operating through sprocket 78 to effect the 10 r.p.m. rotation. Duty on bearings 77 is light, and lubrication is obtained by maintaining an oil level in the bearing. The oil is retained in the bearing housing by oil seal 81. An air seal is also provided to prevent leakage from the housing between the rotating gutter in the housing comprising an air supply opening 79 into an annular space 80 and thence through a close clearance 82 between the housing and the rotating gutter. This inflow of clean air prevents leakage of hot dusty air outward from the centrifuge and keeps oil seal 81 clean.

While we have illustrated and described a preferred embodiment of our invention it is to be understood that such is merely illustrative and not restrictive and that variations and modifications may be therein without departing from the spirit and scope of the invention. We therefore do not wish to be limited to the precise details set forth but desire to avail ourselves of such changes as fall within the purview of our invention.

What is claimed is:

1. A lubricating system for a centrifuge comprising: a rotating bowl; a rotating conveyor located co-axially inside said rotating bowl; means for supplying slurry longitudinally through the axis of said rotating conveyor; said rotating conveyor having a hollow cylindrical shaft extending outwardly from the conveyor; said rotating bowl having a shaft concentrically surrounding said conveyor shaft and spaced therefrom; a bearing between said conveyor and bowl shafts; an oil seal between said conveyor and bowl shafts on the inboard side of said bearing; a stationary member toward the outboard end of said shafts; an oil seal between said stationary member and the outboard end of said bowl shaft; an oil seal between said stationary member and the outboard end of said conveyor shaft; oil circulating means in fluid communication with the annular space between said shafts, through said stationary member at the outboard end, and with the annular space at the inboard side of said bearing, including said bowl shaft having a radial hole therethrough at a location inboard of said bearing; and a stationary member forming an annular space in fluid communication with the radial hole throughout at least a portion of the rotation of said bowl shaft.

2. An apparatus as in claim 1 having also a stationary axially located slurry feed pipe; said conveyor shaft concentrically surrounding said feed pipe in spaced relation therewith; and said stationary member being rigidly fastened to said slurry feed pipe.

3. An apparatus as in claim 2 wherein the radius of the annular space inboard of said bearing and outboard of said bearing is less than the radius of the bearing surface around the axis of said shafts.

4. An apparatus as in claim 1 wherein said rotating bowl and said rotating shaft are arranged to provide an annular space immediately inboard of said inboard oil seal and with a small clearance located inboard of said annular space between the bowl shaft and the conveyor shaft; means for supplying air at a pressure higher than the pressure existing within said casing including means for introducing air into said casing throughout an annular space surrounding said bowl shaft; said bowl shaft having a radial hole therethrough in communication with said annular air space in said casing and said annular air space inboard of said inboard oil seal.

5. An apparatus as in claim 2 having means for supplying air at a pressure higher than that existing within said casing through said stationary member into an annular space surrounding said slurry feedpipe, said annular space being in fluid communication with said outboard seal between said conveyor shaft and said stationary member; said annular space also being in fluid communication with the space between said slurry feed pipe and said conveyor shaft whereby the introduced air flows inwardly between slurry supply pipe and said conveyor shaft to the interior of the centrifuge.

References Cited

UNITED STATES PATENTS

| | | | |
|---|---|---|---|
| 2,733,856 | 2/1956 | Kjellgren | 233—7 |
| 3,051,497 | 8/1962 | Wigg | 277—3 |
| 3,187,997 | 6/1965 | Gooch | 233—1 |
| 3,194,492 | 7/1965 | Koffinke | 233—1 |

ROBERT W. JENKINS, *Primary Examiner.*